(12) United States Patent
Patel

(10) Patent No.: US 7,457,604 B2
(45) Date of Patent: *Nov. 25, 2008

(54) METHOD FOR SUPPRESSING MOTOR VEHICLE RADIO INTERFERENCE

(75) Inventor: Vipul M. Patel, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 710 days.

This patent is subject to a terminal disclaimer.

(21) Appl. No.: 11/043,722

(22) Filed: Jan. 26, 2005

(65) Prior Publication Data

US 2005/0136871 A1 Jun. 23, 2005

Related U.S. Application Data

(63) Continuation-in-part of application No. 10/665,795, filed on Sep. 18, 2003, now Pat. No. 7,197,290.

(51) Int. Cl.
*H04B 1/10* (2006.01)

(52) U.S. Cl. ................. 455/296; 455/297; 455/298; 455/343.1

(58) Field of Classification Search .............. 455/296, 455/297, 298
See application file for complete search history.

(56) References Cited

U.S. PATENT DOCUMENTS

| | | | | | |
|---|---|---|---|---|---|
| 4,879,758 | A | * | 11/1989 | DeLuca et al. | 455/296 |
| 5,519,889 | A | * | 5/1996 | Hipp | 455/297 |
| 6,147,938 | A | * | 11/2000 | Ogawa et al. | 369/12 |
| 6,842,609 | B2 | * | 1/2005 | Davis et al. | 455/161.3 |
| 7,020,579 | B1 | * | 3/2006 | Miseli et al. | 702/182 |
| 7,197,290 | B2 | * | 3/2007 | Patel | 455/296 |

* cited by examiner

*Primary Examiner*—Yuwen Pan

(57) ABSTRACT

A method is provided for suppressing interference in a motor vehicle radio that is capable of executing a seek/scan function. Interference may occur from signals generated by a source of time varying signal that operates in the motor vehicle at a predetermined operating frequency. The method comprises the steps of sending a message indicating initiation of a seek/scan function. In response to this message, the operating frequency of the source of time varying signal is cycled between the predetermined operating frequency and an adjusted operating frequency.

17 Claims, 2 Drawing Sheets

METHOD FOR SUPPRESSING MOTOR VEHICLE RADIO INTERFERENCE

CROSS-REFERENCES TO RELATED APPLICATIONS

This is a continuation-in-part of application Ser. No. 10/665,795, filed Sep. 18, 2003 now U.S. Pat. No. 7,197,290.

TECHNICAL FIELD

The present invention generally relates to a method for reducing interference in a motor vehicle radio, and more particularly relates to a method for reducing interference in a motor vehicle radio caused by sources of time varying signals such as switching power supplies when the motor vehicle radio utilizes a seek/scan function.

BACKGROUND

There may be many sources in a motor vehicle that generate and broadcast time varying signals. For example, motor vehicles frequently employ switching power supplies that utilize pulse width modulation to convert the voltage from the vehicle power supply (usually twelve volts) to whatever particular voltage levels are required to run the various electronic modules connected to the power supplies. The switching power supplies nominally operate at an operating frequency in the frequency range from about 20 to 500 kilohertz (kHz). The operating frequencies or harmonics of the operating frequencies generated by the power supplies may cause interference with some motor vehicle radios, especially with the amplitude modulation (AM) frequency band of a motor vehicle radio. The AM frequency band extends from 520 kHz to 1710 kHz and especially the low-order harmonics of switching power supply operating frequencies may fall within that AM band frequency range. Because AM radio tuners have a ten kHz resolution, radio interference is experienced whenever a power supply operating frequency or harmonic of that operating frequency is within plus or minus five kHz (the interference range) of the frequency to which the radio is tuned.

As disclosed in commonly assigned patent application Ser. No. 10/665,795, the entire disclosure of which is incorporated herein by reference, the problem of interference from switching power supplies and other sources of time varying signals in a motor vehicle can be largely overcome by switching the operating frequency of potential sources of such time varying signals to insure that the operating frequencies and all of the harmonics of the operating frequency are outside the interference range of the frequency selected by the tuned radio. The method disclosed in the above identified patent application comprises the steps of communicating to the source of the time varying signal the frequency selected by the tuned radio, comparing the selected frequency to the operating frequency of the source of the time varying signal and to the harmonics of that operating frequency, and adjusting the operating frequency if the operating frequency or any of the harmonics of the operating frequency fall within a predetermined interference range of the selected frequency. A further problem occurs, however, when using such frequency shift interference reduction in a motor vehicle having a motor vehicle radio that is capable of executing a seek/scan function. The message used to communicate the selected frequency must be sent out over a bus that couples the radio and the module that is the source of the time varying signal. Unfortunately, sending such a message can cause a problem because of bus latency. The receiving module must receive the message, decode the message, and then adjust its frequency (if necessary). If these steps are carried out at every tuned frequency encountered during the seek/scan function, including frequencies corresponding, not to a radio station signals, but to the operating frequency or a harmonic of the operating frequency of the module generating the time varying signal, this will result in a significant delay and a correspondingly long seek/scan time.

Accordingly, it is desirable to provide a method for suppressing motor vehicle radio interference, caused by a module within the motor vehicle that generates a time varying signal, when the motor vehicle radio is capable of executing a seek/scan function. Furthermore, other desirable features and characteristics of the present invention will become apparent from the subsequent detailed description and the appended claims, taken in conjunction with the accompanying drawings and the foregoing technical field and background.

BRIEF SUMMARY

A method is provided for suppressing interference in a motor vehicle radio that is capable of executing a seek/scan function. Interference may occur from signals generated by a source of time varying signal that operates in the motor vehicle at a predetermined operating frequency. The method comprises the steps of sending a message indicating initiation of a seek/scan function. In response to this message, the operating frequency of the source of time varying signal is cycled between the predetermined operating frequency and an adjusted operating frequency.

BRIEF DESCRIPTION OF THE DRAWINGS

The present invention will hereinafter be described in conjunction with the following drawing figures, wherein like numerals denote like elements, and wherein FIG. 1 schematically illustrates a series of linked electronic modules in accordance with one embodiment of the invention.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Motor vehicles commonly include electronic power supplies or other sources that generate time varying signals. Such sources include, for example, but are not limited to switching power supplies that are used to convert the battery or alternator voltage to whatever voltage level is needed to power a particular electronic module such as a display unit, anti-lock brake controller, and the like. Without loss of generality, but for ease of description and understanding, in the following description of the invention, such sources of time varying signal will hereinafter be referred to simply as power supplies or switching power supplies. The time varying signals generated by such power supplies can cause interference in the reception of signals by a radio in the motor vehicle. As disclosed in the above identified patent application Ser. No. 10/665,795, much of this interference can be suppressed by frequency shifting the operating frequency of any power supply causing the interference. Such frequency shifting to suppress interference, however, is inefficient when using the seek/scan function available in most motor vehicle radios.

As is well known, enabling the seek function causes the radio to tune to the next higher (or lower) frequency at which a signal is present if the signal is of a magnitude exceeding the threshold discrimination level of the radio receiver. By repeatedly enabling the seek function, the radio will tune to consecutively occurring higher (or lower) frequency signals. Enabling the scan function causes the radio to tune to the next higher (or lower) frequency at which a signal is present if the signal is of a magnitude exceeding the threshold level of the radio receiver, remain tuned at that frequency for a predetermined length of time (the dwell time of the seek/scan function), and then repeat the process over and over with each next higher (or lower) frequency. As used herein, the term "seek/scan function" will be used for either or both the seek function and the scan function. Methods for implementing the seek/scan function in a motor vehicle radio are well known and need not be discussed here.

Figure 1:
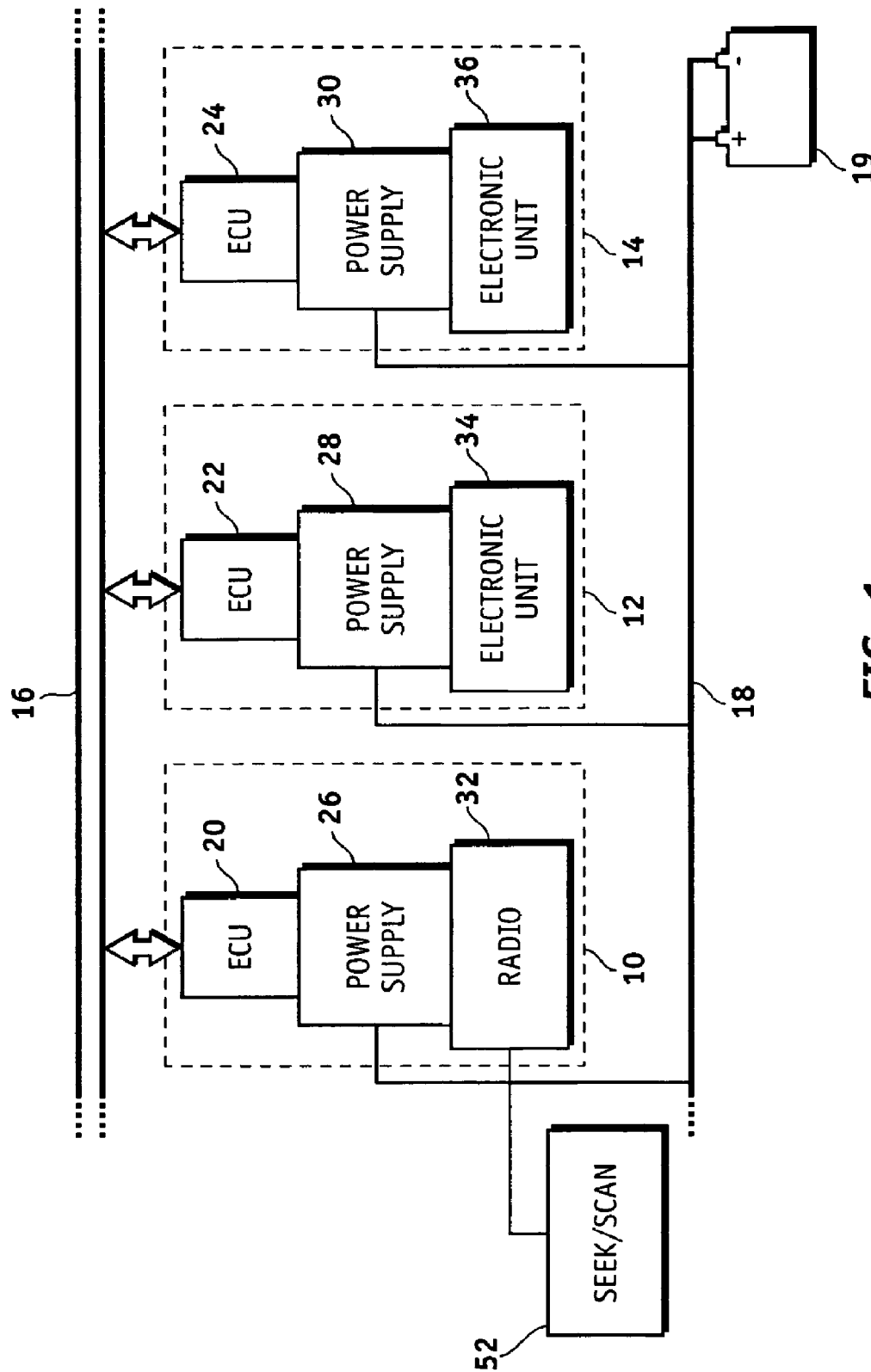

A motor vehicle may have a plurality of electronic modules that generate and broadcast time varying signals that interact unfavorably with received radio signals. Although the problem of interference with radio reception is particularly troublesome for AM radio reception, the potential problem also exists for other radio reception. FIG. 1 schematically illustrates a number of electronic modules 10, 12, and 14 that are coupled together in a manner commonly found in a motor vehicle. One of the electronic modules, module 10 for example, can include a motor vehicle radio. The remaining electronic modules can be related, for example, to display units, anti-lock brake controllers, or other electronic functions now commonly found on motor vehicles. In accordance with an embodiment of the invention, the electronic modules are all coupled to a data bus 16 and to a wiring harness 18. Although only three electronic modules are illustrated in FIG. 1, a motor vehicle electronics system may have any number of such electronic modules. Data bus 16 is preferably a serial data bus and may be implemented as a local area network (LAN) or the like. Wiring harness 18 is provided for the distribution of a DC voltage from motor vehicle power supply 19 which can be, for example, the motor vehicle 12 volt battery or the motor vehicle alternator (not illustrated). Each of electronic modules 10, 12, and 14 comprises an electronic control unit (ECU) 20, 22, and 24, a switching power supply 26, 28, and 30, and an electronic unit 32, 34, and 36, respectively. Those of skill in the art will recognize that motor vehicle electronics typically involve a number of switching power supplies, but that other motor vehicle electronics besides switching power supplies are also potential sources of interfering time varying signals. For illustration purposes only, electronic unit 32 can be, for example, a radio, electronic unit 34 can be an electronic display unit, and electronic unit 36 can be an anti-lock brake controller. Electronic units 34 and 36 could also be other electronic units that perform other function in the operation or enjoyment of the motor vehicle. Switching power supplies 26, 28, and 30 are coupled to and receive the DC voltage distributed by wiring harness 18 and, using pulse width modulation (PWM), convert the standard motor vehicle voltage to the correct voltage needed to run its associated electronic module. In common motor vehicle usage the switching power supplies are each designed to operate with an operating frequency that falls within the range of about 20 kHz to 500 kHz although other frequencies may also be used. The ECUs in each electronic module control, at least in part, the operation of the electronic units in the corresponding module and, as will be explained more fully below, control the operating frequency of the switching power supplies. Data bus 16 is coupled to each of electronic control units 20, 22, and 24 and allows the ECUs to send and receive communication signals over the data bus. The various ECUs and switching power supplies illustrated need not all be the same, but rather can be specified for compatibility with the electronic unit with which they are associated. The ECUs can be microcontrollers or the like programmed in conventional manner as is known to those of skill in the art. Each of the switching power supplies is configured to provide the voltage level needed by its associated ECU and electronic unit. In accordance with an embodiment of the invention, electronic unit 32, the motor vehicle radio, is coupled to a control 52 that enable the seek/scan function in the radio. When the seek/scan function is enabled by control 52, for example when the radio operator in the motor vehicle pushes a seek or scan button, the radio tunes to the next available higher (or lower) frequency. When in the scan mode, the radio remains at that next available frequency for a predetermined dwell time (the seek/scan function predetermined dwell time), typically a fraction of a second, before tuning to the next still higher (or lower) frequency.

In accordance with an embodiment of the invention, electronic unit 32 is a motor vehicle radio capable of tuning and receiving AM frequency signals. The motor vehicle radio preferably has a tuning resolution of 10 kHz and a corresponding interference range of plus or minus 5 kHz. Further in accordance with this embodiment of the invention, when the seek/scan function of the motor vehicle radio is enabled, a message is sent over bus 16 to each of the ECUs in each of the electronic modules indicating to each of the ECUs that a seek/scan function is being initiated. Receipt of the message indicating initiation of the seek/scan function causes each of the sources of time varying signal (the switching power supplies in this illustrative embodiment) in each of the electronic modules to begin cycling the operating frequency of the switching power supply between the nominal operating frequency for that power supply and an adjusted operating frequency. Preferably the adjusted operating frequency differs from the nominal operating frequency by an amount greater than the predetermined interference range of the motor vehicle radio. Preferably the cycle time period for cycling the frequency of the power supply is less than the dwell time of the seek/scan function.

Figure 2:
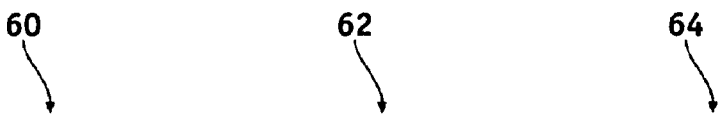
FIG. 2 schematically illustrates, in matrix form, results of application of one embodiment of the invention.

In accordance with one embodiment of the invention, during the time that the power supplies are cycling the operating frequency, the motor vehicle radio is set to lock onto a selected frequency only if the signal received by the radio is a continuous signal at a given frequency. Thus the motor vehicle radio will lock onto a radio station transmitting at a continuous frequency, but will not lock onto a noise source generated within the motor vehicle because the noise sources generated within the motor vehicle will not be constant, but instead will be cycling between two frequencies at a cycle time period less than the seek/scan function dwell time. This effect of this embodiment of the invention is illustrated by the matrix in FIG. 2. In the matrix left hand column 60 illustrates the status of signals from the possible noise sources present in the motor vehicle, center column 62 illustrates the status of possible radio station broadcast signals, and right hand column 64 illustrates the net effect of these signals on a motor vehicle radio operating in accordance with an embodiment of the invention. In the matrix an arrow indicates a signal at a frequency that is within the resolution range of the motor vehicle radio and a circle illustrates the absence of such a signal. As illustrated in box 66 of FIG. 2, a potential noise source is cycling between two frequencies: one frequency, either the operating frequency of a power source or one of its harmonics, illustrated by the arrow, is within the resolution range of the motor vehicle radio and a second adjusted frequency, illustrated by the circle, that is outside the resolution range of the motor vehicle radio. As illustrated in box 68 a radio station is broadcasting at a frequency within the resolution range of the motor vehicle radio as indicated by the arrow in that box. As illustrated in box 70, the effect of the noise source in box 66 and the radio signal in box 68 is that the radio locks onto the radio station signal because that signal is broadcast at a continuous frequency and the noise signal is not at a continuous frequency. Similarly, as illustrated in the second row of the matrix, if a radio broadcast signal occurs within the resolution range of the motor vehicle radio (box 74) and no noise signal is present within that resolution range (box 72), the radio will lock onto the radio broadcast signal (box 76). As illustrated in the third row of the matrix, if a potential noise source is cycling between two frequencies (box 78): one frequency, either the operating frequency of a power source or one of its harmonics that is within the resolution range of the motor vehicle radio and a second adjusted frequency that is outside the resolution range of the motor vehicle radio but no radio broadcast signal occurs (box 80), the motor vehicle radio will not lock onto the noise signal (box 82) because the noise signal is not a continuous signal at a given frequency. And finally, as illustrated by the last line of the matrix, if no noise signal occurs (box 84) and no radio broadcast signal occurs (box 86), the motor vehicle will not lock onto a frequency in this range (box 88) but instead will continue to scan for a higher (or lower) frequency.

In accordance with another embodiment of the invention, when the seek/scan function is completed a second message is communicated over bus 16 indicating the motor vehicle radio has locked on a selected frequency and has exited from the seek/scan function. In response to receiving this second message, the power sources, each of the sources of time varying signal, terminates the cycling of operating frequency. Either as a part of the message indicating the exit from the seek/scan function or in a separate further message communicated on bus 16, the selected frequency is communicated to each source of time varying signal. The selected frequency is compared to the operating frequency and to the harmonics of the operating frequency of each source of time varying signal. If any operating frequency or harmonic of that operating frequency is found to fall within a predetermined interference range (typically plus or minus 5 kHz for an AM radio signal), that operating frequency is adjusted by a sufficient amount to avoid interference of the operating frequency or harmonic with the selected frequency.

The message indicating initiation of the seek/scan function, the message indicating exiting from the seek/scan function, and the message communicating the selected frequency can be sent from ECU 20 associated with motor vehicle radio 32 or they can be sent by a centralized control unit that has control over a plurality of motor vehicle functions. Although in the illustrative embodiment a separate ECU and a separate power supply has been indicated for each of the electronic modules, in some applications electronic control units and/or power supplies may be shared between certain electronic modules.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for suppressing interference in a motor vehicle radio capable of executing a seek/scan function in a motor vehicle having a source of time varying signal operating at an operating frequency, the method comprising the steps of:
    sending a message indicating initiation of a seek/scan function; and
    cycling the operating frequency of the source of time varying signal between the operating frequency and an adjusted operating frequency in response to the message.

2. The method of claim 1 further comprising the step of causing the motor vehicle radio to lock onto a received signal during the seek/scan function only if the received signal comprises a continuous signal at a given frequency.

3. The method of claim 2 further comprising the steps of:
    sending a second message in response to exiting from the seek/scan function; and
    terminating the step of cycling the operating frequency in response to receiving the second message.

4. The method of claim 2 further comprising the steps of:
    sending a further message in response to tuning the radio to a selected frequency, the further message communicating the selected frequency;
    comparing the selected frequency to the operating frequency and to harmonics of the operating frequency; and
    adjusting the operating frequency if the operating frequency or any harmonic of the operating frequency falls within a predetermined interference range of the selected frequency.

5. The method of claim 1 wherein the seek/scan function has a predetermined dwell time and wherein the step of cycling the operating frequency comprises the step of cycling the operating frequency of the source of time varying signal at a cycle time period less than the predetermined dwell time.

6. The method of claim 1 wherein the motor vehicle radio has a predetermined interference range and the step of cycling the operating frequency comprises the step of cycling the operating frequency between the operating frequency and a frequency displaced from the operating frequency by an amount greater than the predetermined interference range.

7. A method for suppressing interference in a motor vehicle radio capable of executing a seek/scan function in a motor vehicle having a plurality of sources of time varying signal, each of the sources of time varying signal coupled to a single bus, and each of the sources of time varying signal operating at an operating frequency characteristic of the particular source of time varying signal, the method comprising the steps of:
    sending a bus message on the single bus to each of the sources of time varying signal indicating initiation of a seek/scan function;
    cycling the operating frequency of each of the sources of time varying signal between the characteristic operating frequency of each source of time varying signal and an adjusted operating frequency selected for each source of time varying signal in response to the bus message; and causing the motor vehicle radio to lock onto a received signal during the seek/scan function only if the received signal comprises a continuous signal at a constant frequency.

8. The method of claim 7 further comprising the steps of:
sending a second bus message indicating selection of a received signal at a selected frequency; and
terminating the step of cycling the operating frequency in response to receiving the second bus message.

9. The method of claim 8 further comprising the steps of:
sending a further bus message communicating the selected frequency;
comparing the selected frequency to the characteristic operating frequency and to harmonics of the characteristic operating frequency of each of the sources of time varying signal; and
adjusting the operating frequency of any source of time varying signal for which the characteristic operating frequency or any harmonic of such characteristic operating frequency falls within a predetermined interference range of the selected frequency.

10. The method of claim 7 wherein the seek/scan function has a predetermined dwell time and wherein the step of cycling the operating frequency comprises the step of cycling the operating frequency of each of the sources of time varying signal at cycle time periods less than the predetermined dwell time.

11. The method of claim 7 wherein the motor vehicle radio has a predetermined interference range and the step of cycling the operating frequency comprises the step of cycling the operating frequency of each of the sources of time varying signal between the characteristic operating frequency and a frequency displaced from the characteristic operating frequency by an amount greater than the predetermined interference range.

12. A method for suppressing interference in a motor vehicle radio capable of executing a seek/scan function in a motor vehicle having a plurality of sources of time varying signal, each of the sources coupled to a single bus and each of the sources operating at an operating frequency characteristic of the particular source, the method comprising the steps of:
sending a bus message on the single bus to each of the sources indicating initiation of a seek/scan function;
cycling the operating frequency of each of the sources between the characteristic operating frequency of each source and an adjusted operating frequency selected for each source in response to the bus message;
causing the motor vehicle radio to lock onto a received signal during the seek/scan function if and only if the received signal comprises a continuous signal at a constant frequency;
sending a second bus message indicating selection of a received signal at a selected frequency;
terminating the step of cycling the operating frequency in response to receiving the second bus message;
comparing the selected frequency to the characteristic operating frequency and to harmonics of the characteristic operating frequency of each of the sources; and
adjusting the operating frequency of any source for which the characteristic operating frequency or any harmonic of such characteristic operating frequency falls within a predetermined interference range of the selected frequency.

13. A method for suppressing interference in a motor vehicle radio capable of executing a seek/scan function in a motor vehicle having a plurality of sources of time varying signal, each of the sources operating at an operating frequency characteristic of the particular source, the method comprising the steps of:
sending a message indicating initiation of a seek/scan function having a predetermined dwell time;
causing the operating frequency of each of the plurality of sources of time varying signal to shift at a predetermined cycle period that is shorter than the predetermined dwell time in response to the message; and
causing the motor vehicle radio to lock onto a received signal only if the received signal comprises a continuous signal at a constant frequency.

14. The method of claim 13 further comprising the steps of:
sending a second message indicating selection of a received signal at a selected frequency; and
terminating the step of causing the operating frequency of each of the plurality of sources of time varying signal to shift in response to the second message.

15. The method of claim 14 further comprising the step of, in response to the second message, adjusting the operating frequency of any source for which the characteristic operating frequency or any harmonic of such characteristic operating frequency falls within a predetermined interference range of the selected frequency.

16. The method of claim 14 further comprising the steps of:
sending a further message communicating the selected frequency;
comparing the selected frequency to the characteristic operating frequency and to harmonics of the characteristic operating frequency of each of the sources of time varying signal; and
adjusting the operating frequency of any source of time varying signal for which the characteristic operating frequency or any harmonic of such characteristic operating frequency falls within a predetermined interference range of the selected frequency.

17. The method of claim 13 wherein the motor vehicle radio has a predetermined interference range and the step of causing the operating frequency of each of the plurality of sources of time varying signal to shift comprises the step of causing the operating frequency of each of the plurality of sources of time varying signal to shift frequency by an amount greater than the predetermined interference range.

* * * * *